Figure 1:
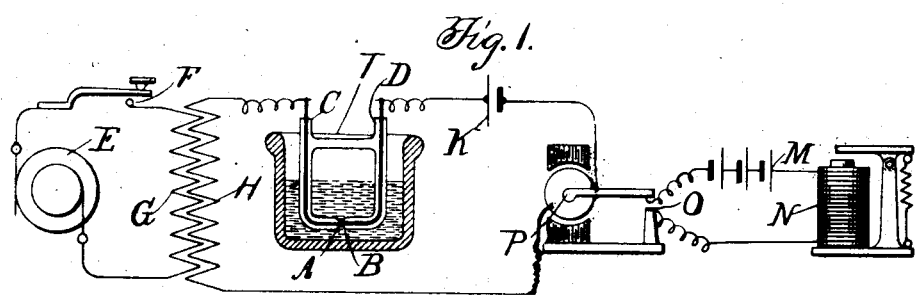

No. 713,045.  
M. I. PUPIN.  
APPARATUS FOR PRODUCING ASYMMETRICAL CURRENTS FROM SYMMETRICAL ALTERNATING ELECTROMOTIVE FORCES.  
(Application filed Sept. 8, 1900.)  
Patented Nov. 4, 1902.

(No Model.)

Witnesses  
Fy H. Whitman  
Edwin S. Hunt

Inventor  
Michael I. Pupin.  
by Thomas Ewing Jr.,  
Attorney

UNITED STATES PATENT OFFICE.

MICHAEL IDVORSKY PUPIN, OF YONKERS, NEW YORK.

APPARATUS FOR PRODUCING ASYMMETRICAL CURRENTS FROM SYMMETRICAL ALTERNATING ELECTROMOTIVE FORCES.

SPECIFICATION forming part of Letters Patent No. 713,045, dated November 4, 1902.

Original application filed January 4, 1898, Serial No. 665,550. Divided and this application filed September 8, 1900. Serial No. 29,404. (No model.)

*To all whom it may concern:*

Be it known that I, MICHAEL IDVORSKY PUPIN, a citizen of the United States of America, residing at Yonkers, county of Westchester, State of New York, have invented certain new and useful Improvements in Apparatus for Producing Asymmetrical Currents from Symmetrical Alternating Electromotive Forces, of which the following is a specification.

An asymmetrical current is a periodic current in which the total number of coulombs flowing in one direction is greater than the total number flowing in the opposite direction. Such a current will deflect a permanent magnet and be deflected by it and will produce electrolysis. It is equivalent to the periodic unidirectional impulses equal to the difference between the numbers of coulombs transmitted in opposite directions.

The object of this invention is to provide means for producing an asymmetrical current in a circuit on which is impressed an alternating electromotive force by opposing to such electromotive force an electromotive reaction which is greater in one direction than in the other. I thus construct a circuit which will offer an asymmetrical impedance to a simple harmonic electromotive force. This electromotive reaction can be produced by placing in the circuit a direct-current generator and a reversible preferably non-cumulative electrolytic polarization-cell, the capacity reactance of which for the frequency of the electromotive force to be employed is as large as or preferably greater than the other reactance of the circuit. Upon this circuit I superimpose an alternating electromotive force. The direct-current generator (say a voltaic cell) and a polarization-cell, which I shall call a simple "electrolytic" cell (say two platinum electrodes in dilute sulfuric acid) taken together constitute an asymmetrical electrolytic element which possesses an alternating electromotive reaction that is greater in one direction than in the other. Such an element is the equivalent of a cell (which may also be described, broadly, as an "element") which has the property of developing a higher counter electromotive force when traversed by a current in one direction than when the current is reversed. For example, it is equivalent to a cell consisting of zinc and a platinum electrode immersed in dilute sulfuric acid. In such a cell the difference of potential between the two electrodes is not sufficient to overcome the counter electromotive force due to decomposition of water, and hence it generates no current; but if an electromotive force be impressed such a cell opposes a greater counter electromotive force in one direction than in the other. It may be pointed out here that none of these arrangements are efficient as rectifiers unless so directed that the electrolytic capacity of the cell is properly adjusted with respect to the frequency of the electromotive force, so as to give the capacity reactance the magnitude hereinafter indicated.

Figure 2:
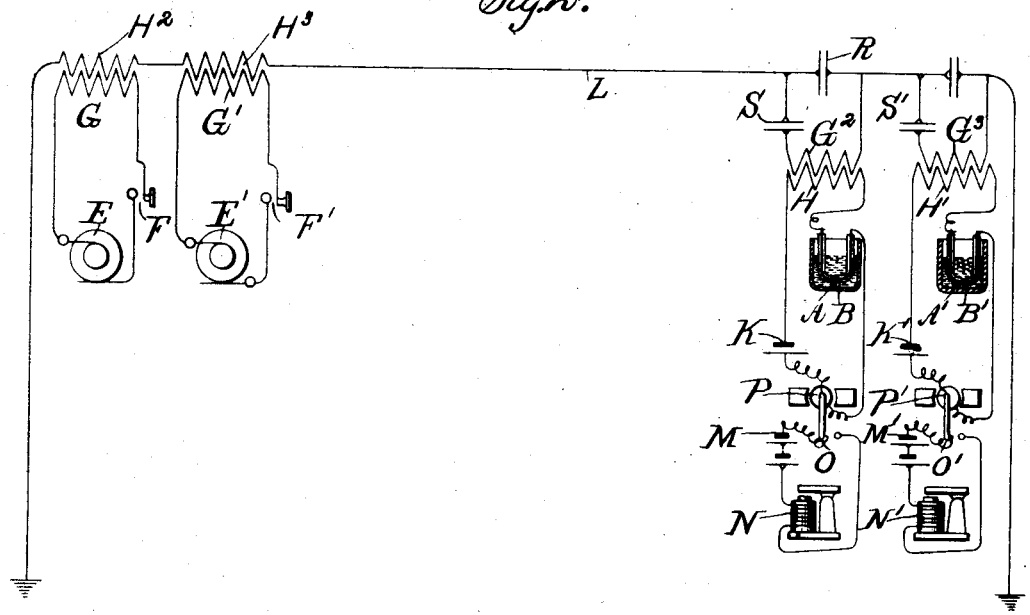

In the accompanying drawings, which form a part of this specification, Figure 1 illustrates my invention as applied to a system in which a direct-current generator and a reversible non-cumulative polarizer are placed in the circuit. Fig. 2 shows the arrangement of Fig. 1 as applied to multiplex telegraphy by resonance circuits.

In Fig. 1 a generator E of alternating electromotive force of any convenient type is placed in series with a key F and the primary coil G of a transformer. The key may be, for example, an ordinary telegraph - key. Whenever it is closed, an alternating current flows in the circuit E F G. The circuit may be of any convenient length, and, if desired, it may include a telegraphic main line, or the line may be interposed between the coils which are in inductive relation with coils G and H, respectively, as shown in Fig. 2. A coil H, forming the secondary coil of the transformer G H, is placed in circuit in series with a primary cell K, a suitable magnetic circuit-relay closer P, and an electrolytic polarization-cell containing two terminal wires, preferably of platinum, which are fused into two glass tubes C D, so that the ends A B are exposed beneath the liquid. The tubes are united by a cross-bar T to preserve their relative position with respect to each other, and they are bent inwardly at the lower ends, so that the exposed ends A B can be brought as close together as is desired. These ends form the plates of the electrolytic cell. It is desirable to have them as small as possible—say one square millimeter—and as close together as possible without actual contact, so that the cell will have small capacity and small internal resistance. The distance apart is conveniently adjusted by heating and softening the cross-bar T, then placing a thin sheet of mica between the ends of the wires and bringing them in contact with it on opposite sides while the cross-bar cools and sets, after which the mica is removed. The exposed ends of the wires are then immersed in a suitable electrolytic, as dilute sulfuric acid, and connected to the circuit, as shown. The cell thus formed will be non-storage or noncumulative, because the gases will readily bubble away from the small plates, and since it is of small capacity the full counter electromotive force is quickly attained. It is capable of developing at its maximum about two volts counter electromotive force of polarization.
The direct-electromotive-force generator K may be an ordinary primary cell. It is obvious that either the polarization-cell or the primary cell, or both, may be replaced by batteries of cells in series; but the primary cell or battery should develop an electromotive force preferably equal to or slightly less than the maximum counter electromotive force of the polarization-cell or battery of cells. The term "cell" will hereinafter be used to mean either a single cell or a battery of cells.

The primary cell and the polarization-cell together produce no current; but when the key F is closed the alternate electromotive force is also imposed upon the circuit H A B K P.

The counter electromotive force of the electrolytic cell when charged to its full capacity will be equal to the decomposition value of the electrolyte, and it is assumed that the electrolytic cell develops at its maximum a counter electromotive force about equal to that of the primary cell. Platinum electrodes in dilute sulfuric acid develop a counter electromotive force of about two volts. Obviously with these two cells alone in the circuit there will be no conduction-current; but while the plates are receiving a charge what may be called a "condenser-current" is flowing. After the plates have been fully charged the two cells will balance each other; but the circuit has this peculiarity, speaking generally, that both the capacity reactances of the electrolytic cell and the electromotive force of the primary battery will oppose an alternating electromotive force during one half period and not during the other half period. The capacity of the electrolytic cell can be diminished and its capacity reactance proportionately increased by reducing the size of the plates. If under the conditions stated, with the electromotive force of the primary cell and the counter electromotive force of the electrolytic cell balanced against each other, an alternating electromotive force is impressed upon the circuit, the circuit will have resistance reaction and self-induction reactance (the self-induction reactance being that of the apparatus in the circuit) when the phase of the alternating electromotive force is in the same direction as the electromotive force of the primary cell, and when it is opposed the circuit, in addition to these two reactances, will have also a capacity reactance. If, therefore, the capacity reactance be made large in comparison with the other two reactances, the current flowing in one direction will be large in comparison with the quantity flowing in the other direction. It is only necessary to make the capacity reactance sufficiently large in order to make the current consist practically of a series of unidirectional impulses. It is clear that the values of the electromotive forces need not be in the ratio stated above, but may be in any convenient ratio, so long as the maximum electromotive force developed in the polarization-cells is less than the sum of the other two electromotive forces when these have the same sign. Then there will always be obtained an asymmetrical current.

It is not necessary to have a polarization-cell of the construction given above. Any other polarization device having the properties heretofore stated may be substituted for either of the cells herein described. It must, however, be a cell the capacity of which is properly proportioned with respect to the frequency of the impressed electromotive force, so as to give it a capacity reactance which is of the magnitude described, and for very efficient rectification the capacity reactance should be, say, as much as one hundred times as large as any of the other reactances of the circuit.

This invention is of considerable value in several applications for practical purposes, and its application to telegraphy by alternating currents, and more particularly to multiplex telegraphy by resonant receiving-circuits, will now be described. The chief difficulty in using alternating currents for telegraphy is that the magnetizing force of the current transmitted must, generally speaking, be relied on to produce the entire magnetic effect in the receiving instruments, and this magnetizing force, being proportional to the square of the magnetizing-current, falls off rapidly when the current is diminished, as it always is in transmission over long lines. With direct currents, however, the currents transmitted can be acted upon at the receiver by strong magnetic fields produced independently of these currents, as by powerful permanent magnets or electromagnets. Hence by the aid of this invention much stronger effects can be produced in the receiving apparatus with a given impressed alternating electromotive force than is possible without the aid of the invention.

The application of the invention to telegraphy without employing resonance effects is illustrated in Fig. 1. In this figure the armature P, which is placed between the poles of a powerful permanent magnet, operates a circuit-closer O, which closes a local circuit in which is a battery M and a sounder N.

A system of multiple telegraphy by resonance receiving-circuits is illustrated in Fig. 2. A long telegraphic line L has at the transmitting end means for impressing on the line independently of each other and simultaneously or otherwise several alternating currents of different periodicities. For instance, there may be several local transmitting-circuits G F E of Fig. 1 acting upon the line through transformers like G H², the secondary coils being connected in the line in series. The different generators should generate alternating currents of different periodicities. At the receiving end should be several receiving resonance-circuits, like R S G², in which R and S are adjustable condensers and G² is the primary coil of a transformer G² H. Each of these receiving-circuits should be tuned to resonance with one of the impressed electromotive forces. Connected with each is a circuit H A B K P, producing an asymmetrical current, and a relay-circuit M N O, like the similarly-lettered circuits in Fig. 1. The advantages of using a separate circuit H A B K P in addition to the resonance-circuit R S G² is that it enables the construction of a resonance-circuit the electromagnetic constants of which are not appreciably effected by the constants of the receiving instrument, since it not be put in the resonance-circuit. I have practiced the invention herein disclosed successfully in rectifying Hertzian oscillations, as well as oscillations of the frequencies produced in ordinary commercial practice. When a circuit is properly adjusted for a given frequency, it will effect even better rectification with all lower frequencies. The converse is of course not true.

I do not in this application claim the herein-described method of producing asymmetrical currents, as such method is claimed in my other application, filed January 4, 1898, Serial No. 665,550, renewed October 4, 1902, as Serial No. 125,991, of which application this is a division.

What I claim, and desire to secure by Letters Patent of the United States, is—

1. The combination of a circuit, means for impressing an alternating electromotive force thereon and an asymmetrical electrolytic element in the circuit, the capacity reactance of which is properly proportioned with respect to the other reactances of the circuit for the frequency of the alternating electromotive force employed, to reduce the condenser-current to a minimum and to secure efficient rectification, substantially as described.

2. The combination of a circuit containing a direct-current source and a simple electrolytic cell, with means for impressing upon the circuit an alternating electromotive force, the capacity reactance of the simple electrolytic cell being properly proportioned with respect to the other reactances of the circuit for the frequency of the alternating electromotive force employed, to reduce the condenser-current to a minimum, and to secure efficient rectification, substantially as described.

3. In a telegraphic system, the combination of suitable transmitting and receiving devices, means for impressing an alternating electromotive force, and a receiving-circuit provided with means for producing an asymmetrical current, which consists of an electrolytic element, the capacity of which is properly proportioned with respect to the other reactances of the circuit, to secure efficient rectification, substantially as described.

4. In a telegraphic system, the combination of suitable transmitting and receiving devices, means for impressing an alternating electromotive force, and a receiving-circuit, provided with means for producing an asymmetrical current, consisting of a direct-current generator and a simple electrolytic cell, the capacity reactance of the simple electrolytic cell being properly proportioned with respect to the other reactances of the circuit for the frequency of the alternating electromotive force employed to secure efficient rectification, substantially as described.

5. In a multiplex telegraphic system by resonance-circuits, the combination of suitable transmitting and receiving devices, means for impressing several alternating electromotive forces of different frequencies independently of each other, and simultaneously or otherwise, and a resonance receiving-circuit provided with means for producing an asymmetrical current consisting of an asymmetrical electrolytic element, the capacity reactance of which is properly proportioned with respect to the other reactances of the circuit to secure efficient rectification, substantially as described.

6. In a multiplex telegraphic system by resonance-circuits, the combination of suitable transmitting and receiving devices, means for impressing alternating currents of different frequencies independently of each other, and simultaneously or otherwise, and resonance receiving-circuits provided with means for producing asymmetrical currents, consisting of a direct-current generator and a simple electrolytic cell, the capacity reactance of the electrolytic cell being properly proportioned with respect to the other reactances of the circuit for the frequency of the alternating electromotive force to secure efficient rectification, substantially as described.

Signed by me in New York city this 22d day of August, 1900.

MICHAEL IDVORSKY PUPIN.

Witnesses:
SAMUEL W. BALCH,
H'Y H. WHITMAN.